(Model.)
B. S. THOMAS.
ANIMAL POKE.
No. 275,732. Patented Apr. 10, 1883.
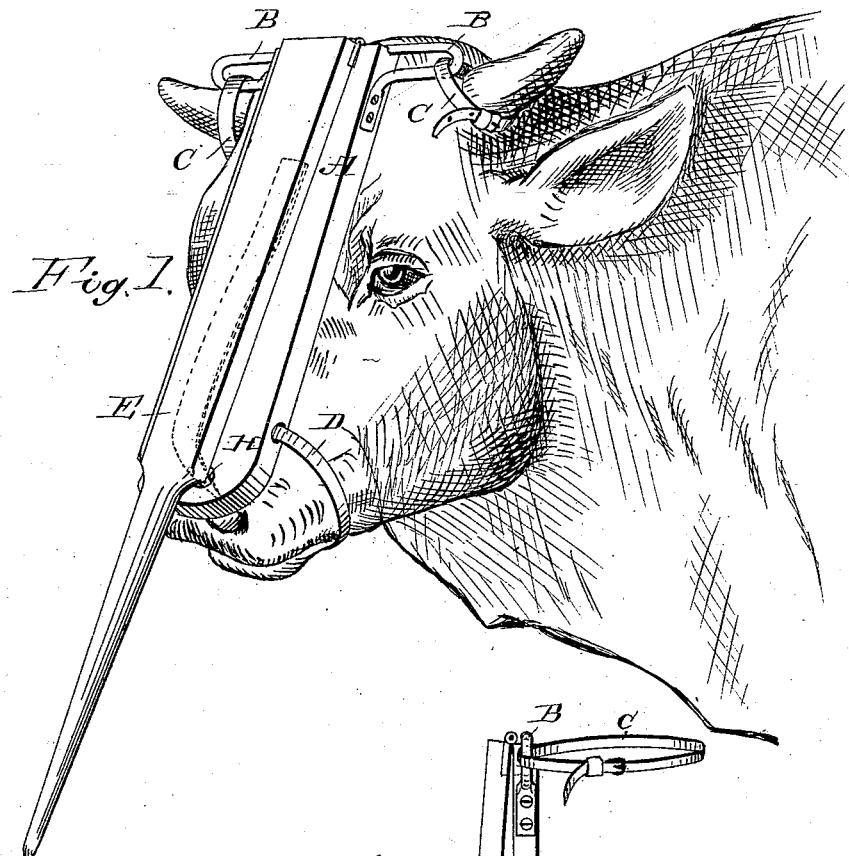
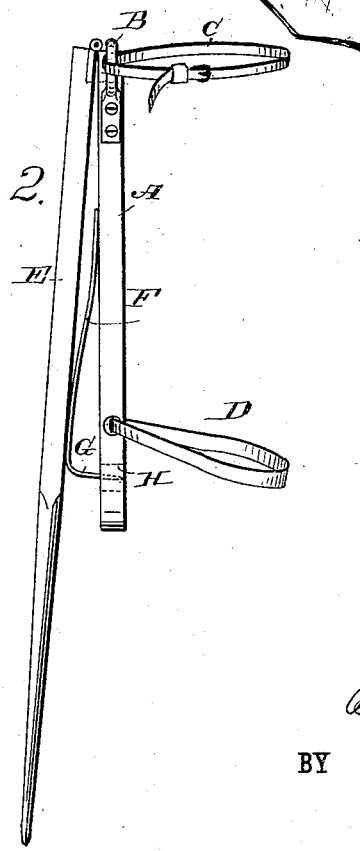
WITNESSES:
Otto B. ejer.
C. Sedgwick
INVENTOR:
B. S. Thomas
BY Munn & Co.
ATTORNEYS.

UNITED STATES PATENT OFFICE.

BOYEL S. THOMAS, OF WAVERLY, ILLINOIS, ASSIGNOR TO COE BROTHERS, OF SAME PLACE.

ANIMAL-POKE.

SPECIFICATION forming part of Letters Patent No. 275,732, dated April 10, 1883.

Application filed November 23, 1882. (Model.)

*To all whom it may concern:*

Be it known that I, BOYEL STONE THOMAS, of Waverly, in the county of Morgan and State of Illinois, have invented a new and Improved Animal-Poke, of which the following is a full, clear, and exact description.

The object of my invention is to provide a device to prevent cattle from running down or jumping fences, fighting, pushing other stock, drinking their own milk, running through brush, and which at the same time permits them to graze and drink at will.

The invention consists in a poke hinged to a board which can be fastened by means of straps on the forehead of the animal, on which board a spring is secured, the lower end of which terminates in a prong passing through the board. When the animal strikes against a fence or another animal with its head the spring-prong will be forced through the aperture in the board, and will prick the animal's nose. The spring immediately withdraws the prong as soon as the pressure on the poke is removed.

Reference is to be had to the accompanying drawings, forming part of this specification, in which similar letters of reference indicate corresponding parts in both the figures.

Figure 1 is a perspective view of my improved animal-poke, showing the manner in which it is applied. Fig. 2 is a longitudinal elevation of the same.

A board, A, is provided at one end with an eye or loop, B, on each side, through which loops straps C are passed, which are passed around the horns of the animal. A strap, D, secured to or passing transversely through the lower part of the board A, is adapted to be passed loosely around the nose and jaw of the animal, so as not to prevent the animal from grazing or drinking. A bar or poke, E, is pivoted to the upper end of the front of the board, which poke projects considerably beyond the lower end of the board A. A spring, F, secured to the outer or upper surface of the board A, at the middle or upper end of the same, has its lower end pointed and bent to form a prong, G, which passes through an aperture, H, in the lower end of the board A. The spring F is of such strength that it keeps the poke E from the outer surface of the board A, and keeps the point of the prong G from the inner surface of the board A. If the animal runs against a fence or brush or strikes other animals, the poke E will be pressed against the board A, and the point of the prong will be forced into the nose of the animal. The pain produced causes the animal to desist from making further attempts of the above-described nature.

The device does not interfere with the watering and grazing of the animal. If attached to cows and goats, it prevents them from fighting, running against fences or through brush, and from sucking themselves. It is especially adapted for breeding-bulls, as they are very vicious and greatly inclined to butt and worry other stock and to ruin fences.

I am aware that it is not new in animal-pokes to use two converging and end-crossing pieces suspended from a cross-piece attached to the horns and provided with plates extending in front of the eyes, or to combine pins, spikes, a spring, and a fastening with a block, or to make a calf-muzzle with means for suspension and a barbed spring-tongue.

I am aware that it is not new to hinge two plates together at one end, provide the outer one with spikes, the inner one with holes, and keep them apart with a spring, said plates being fastened on the breast of the animal; but

What I claim as new and of my invention is—

1. The combination, with the board A and the poke E, hinged to the same and projecting beyond the lower end of the same, of devices for holding the board to the nose and horns of the animal, and of the spring F, terminating in a prong, G, passing through an aperture in the board A, substantially as herein shown and described, and for the purpose set forth.

2. The combination, with the board A and the poke E hinged to the same, of the loops B, the straps C and D, and the spring F, substantially as herein shown and described, and for the purpose set forth.

3. The board A, having side loops at one end and a transverse hole at the other, in combination with buckle-straps C D, whereby the board may be so fastened as to bring it between the horns at the top, between the eyes about the middle, and rest on the nose at the lower end, as shown and described.

4. The combination, with the face-board and thereto hinged bar E, of the intermediate spring, G, made fast at one end to the board, extended down nearly to the bottom, and provided with a bent pointed end extending through a hole, H, in the board, whereby the animal's nose will be pricked whenever he tries to push against a fence or other object.

BOYEL STONE THOMAS.

Witnesses:
  C. C. TURNER,
  J. E. NICHOLSON.